April 28, 1964 R. A. WITTREN 3,130,749
FLUID LINE COUPLING
Filed Jan. 27, 1960 3 Sheets-Sheet 1
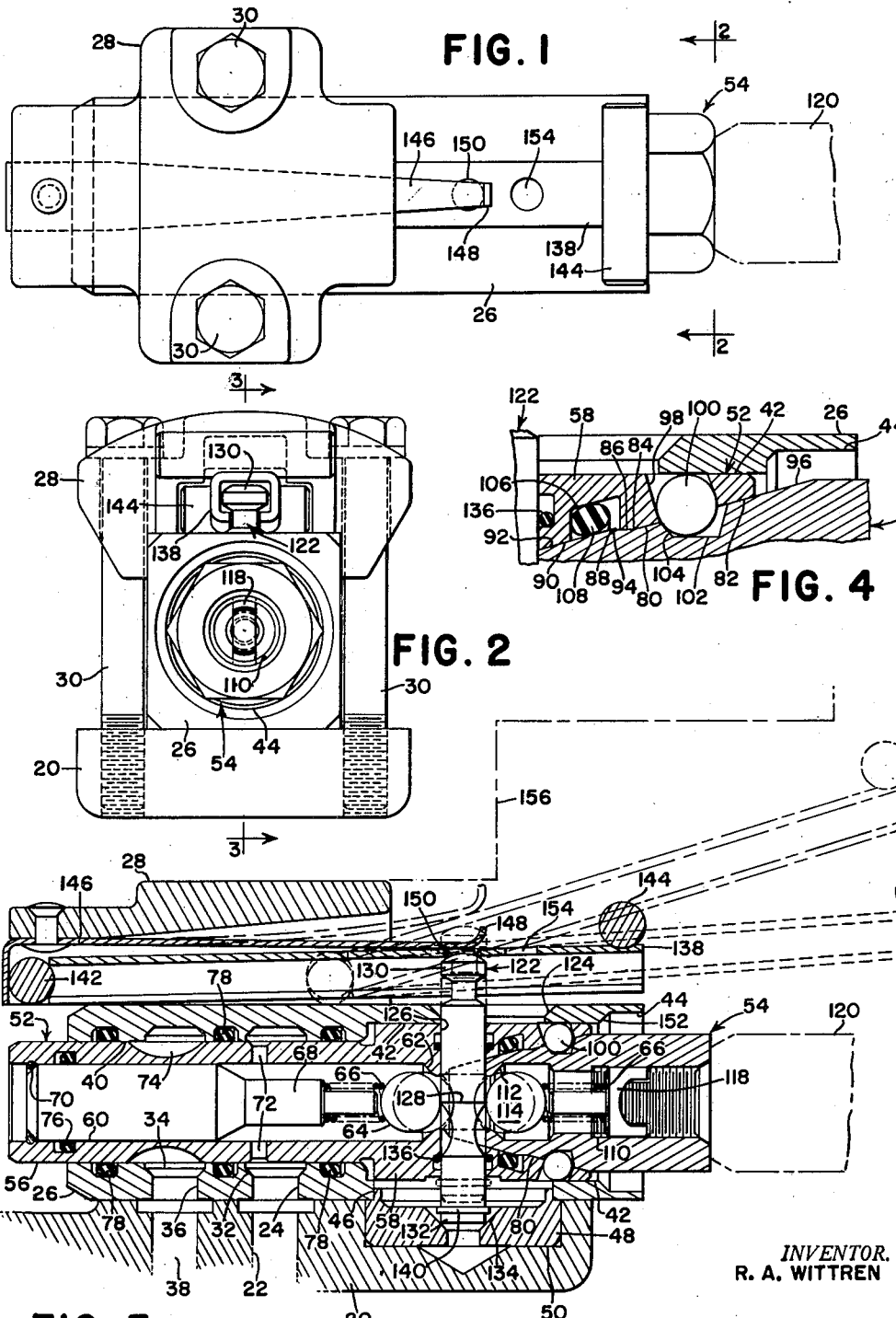
INVENTOR.
R. A. WITTREN April 28, 1964  R. A. WITTREN  3,130,749
FLUID LINE COUPLING
Filed Jan. 27, 1960  3 Sheets-Sheet 2
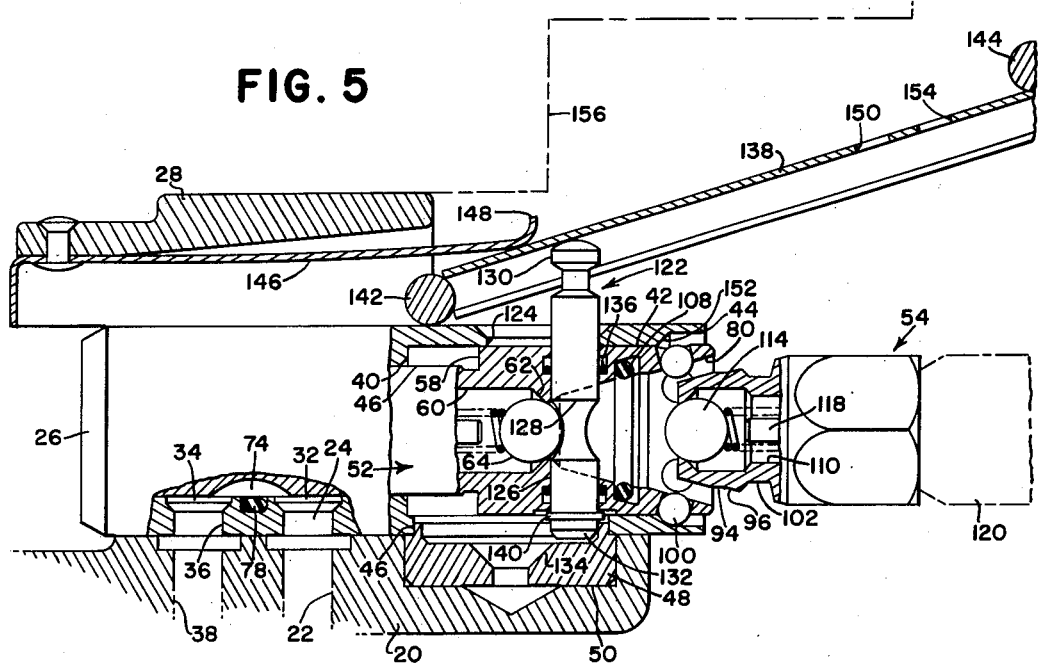
FIG. 5
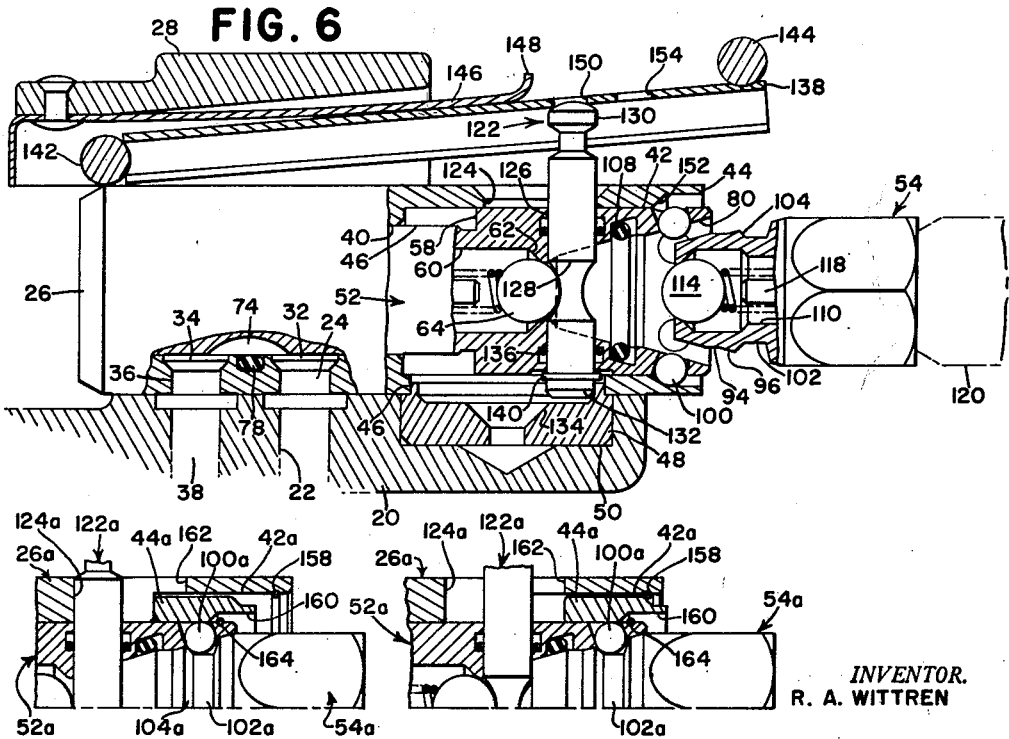
FIG. 6
FIG. 7  FIG. 8
*INVENTOR.*
R. A. WITTREN April 28, 1964   R. A. WITTREN   3,130,749
FLUID LINE COUPLING
Filed Jan. 27, 1960   3 Sheets-Sheet 3
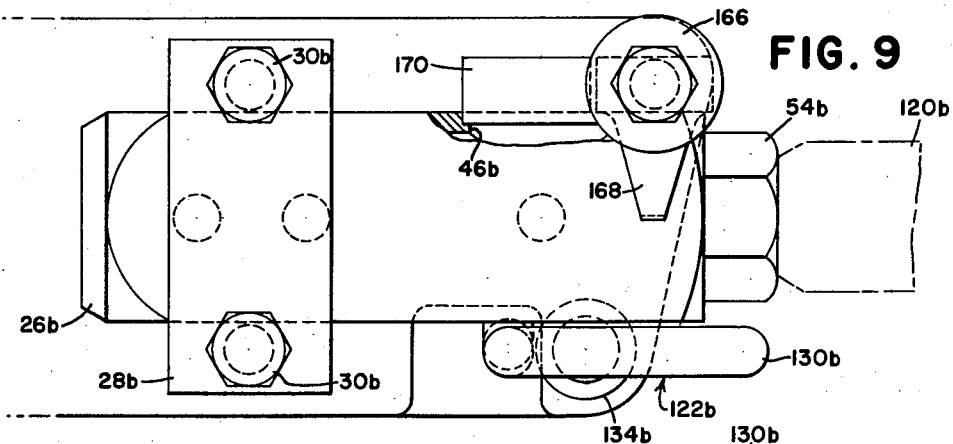
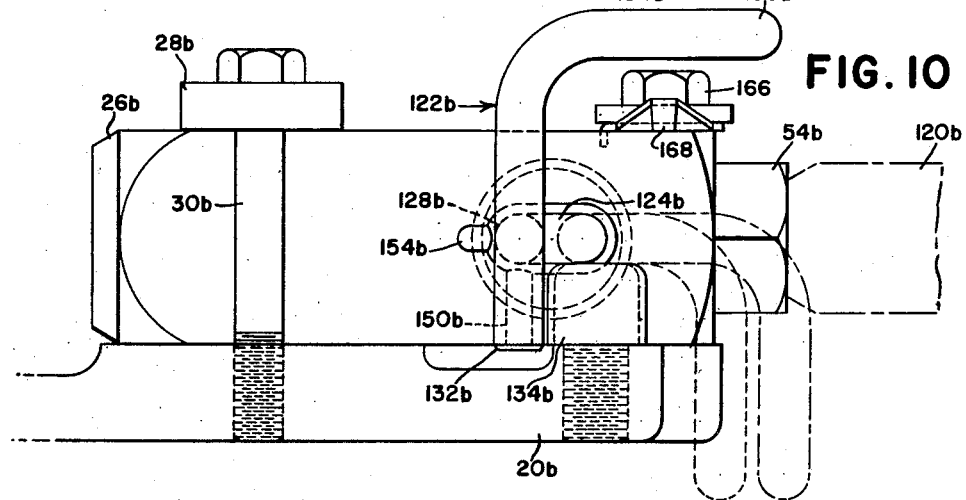
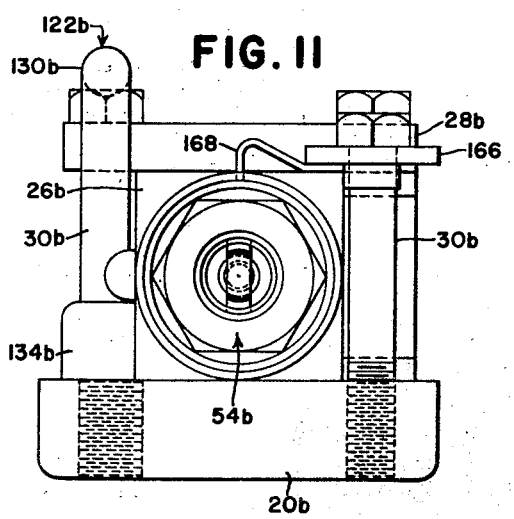
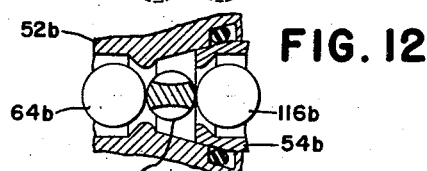
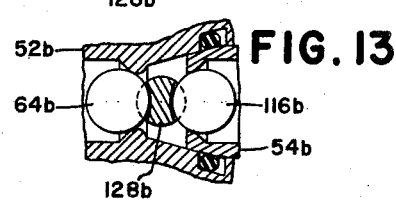
INVENTOR.
R. A. WITTREN United States Patent Office 3,130,749
Patented Apr. 28, 1964

3,130,749
FLUID LINE COUPLING
Richard A. Wittren, Waterloo, Iowa, assignor to Deere & Company, Moline, Ill., a corporation of Delaware
Filed Jan. 27, 1960, Ser. No. 4,930
12 Claims. (Cl. 137—614)

This invention relates to coupling means and more particularly to fluid line coupling means of the releasable type. Still more particularly, the invention relates to such fluid line coupling assembly having valves incorporated in the coupling part and operative automatically in response to separation of the parts to close the respective passages against loss of fluid.

Fluid line couplings of the general character referred to are well known, and most if not all of them operate on the principle that the coupling parts remain connected except when manually disconnected or subjected to a separating force tending to pull the couplings apart. The latter phase of separation is used as a safety feature in vehicular trains in which fluid units are mounted on separate vehicle units and interconnected by flexible fluid lines, the separability feature being incorporated to protect the lines against damage in the event that one vehicle unit becomes disconnected from the other. Although coupling assemblies of this character are, in the main, generally satisfactory, there remain several disadvantages involved in the initial design, in the ability of the coupling parts to be reconnected easily and in the restrictive characteristics often imposed on the parts because of the self-closing valves.

Accordingly, it is one of the important objects of the present invention to provide an improved fluid line coupling assembly eliminating such disadvantages as noted above. Particularly, it is a significant feature of the invention to provide a fluid line coupling of the self-sealing type having means for positively incurring opening and closing of the valves, both at will and automatically in response to separation of the couplings incident to the application of separating forces thereto, as involved in the disconnection of one unit from another in a vehicular train. In this respect, it should be noted that the means for positively opening and closing the valves involves reconnection of the coupling parts without influence of one valve on the other, therefore eliminating the requirement that the reconnecting force be sufficient to overcome the hydraulic force in the lines at the time. A further object resides in improved manual means for controlling the valve operating means externally of the coupling part, in which respect the invention provides as a subsidiary feature a novel operating means capable of movement between a storage position and an operating position.

Other objects of the invention reside in an improved design of the releasable means whereby impact forces are useful in facilitating release of that means, thus substantially eliminating the need for forces necessary to overcome high frictional forces encountered in couplings heretofore known. Still further objects reside in that feature of the invention involving an improved design of interfitting coupling parts enabling the coupling parts to separate or break away even though the application of separating forces may not be strictly coaxial with the coupling. In this respect, the improved design incorporates a cylindrical portion flanked by concial portions allowing a close diametrical clearance to be maintained despite tolerance variations affecting the longitudinal relationship between the coupling parts.

The foregoing and other important objects inherent in and encompassed by the invention will become apparent as preferred embodiments thereof are disclosed in the following detailed description and accompanying sheets of drawings, the several figures of which are described below.

FIG. 1 is a plan view of one form of coupling assembly.

FIG. 2 is an end view, partly in section, as seen along the line 2—2 of FIG. 1.

FIG. 3 is a longitudinal section as seen generally along the line 3—3 of FIG. 2, the view further illustrating in broken lines various positions of the valve operating mechanism and one of the coupling parts.

FIG. 4 is an enlarged fragmentary section showing the design involved in the counterbore or socket of one part and the plug or male of the other coupling part.

FIG. 5 is a section similar to FIG. 3 but illustrating manual operation of the valve means incident to release of the coupling parts.

FIG. 6 is a view similar to FIG. 5 but illustrates automatic separation of the coupling parts and incident operation of the valve operating means.

FIG. 7 is a fragmentary view showing a modified form of control of the release means between the two coupling parts, the view illustrating the coupled or connected position.

FIG. 8 is a similar view showing a condition of the coupling parts just prior to release of the releasable means.

FIG. 9 is a plan of a modified form of coupling assembly.

FIG. 10 is an elevation of the same.

FIG. 11 is an end view of the same.

FIG. 12 is a fragmentary sectional view of portions of the mating sections of the coupling parts, showing the valve operating means in a position in which it positively opens the coupling part valves.

FIG. 13 is a similar view but illustrates the other position of the valve operating means in which closing of the valves is incurred.

The present coupling designs are intended primarily for use with tractors and associated implements; although quite obviously, the couplings and equivalents thereof may be used in other environments. Likewise, it should be noted that the use of such expressions as "front," "rear" etc. is based on convenience only and is not intended to import any limitation into the appended claims or to otherwise limit the scope or applicability of the invention.

The coupling assembly as shown in FIGS. 1–6 is mounted on a suitable support means, here represented by a housing portion 20 which may be part of a vehicle or other structure supplied with a source of fluid under pressure (not shown). As an adjunct thereto, the housing 20 is provided with a fluid pressure passage 22 which communicates with a normally registering passage 24 in a tubular coupling carrier or sleeve 26, which may be regarded as part of the support means represented by the housing 20, inasmuch as it is rigidly secured to the housing by means including a cap 28 and a pair of securing means such as cap screws 30 passed through the cap and threaded into the housing. As best seen in FIG. 2, the external configuration of the carrier or sleeve 26 is square so that it has upper and lower surfaces sandwiched between the cap 28 and housing 20 and opposite side surfaces sandwiched between the cap screws 30. Of course, any other suitable type of mounting could be used, and the particular configuration of the carrier 26 as just described is not material to the present invention.

The carrier is formed with an internal annular groove 32 in register with the port or passage 24, which is radial to the groove. An additional groove 34, spaced axially forwardly from the groove 32, is in register with a radial port or passage 36 which in turn is in register with a housing passage 38, which may lead to reservoir (not shown).

The carrier or sleeve 26 is provided with a fore-and-aft axial bore 40 which continues rearwardly from substantially the mid-point thereof as a counterbore 42 which in turn communicates at the rear end of the carrier as a second and larger counterbore 44, hereinafter sometimes referred to as a control ring for the releasable means to be subsequently described. The wall of the carrier is cut adjacent to the rear end thereof by a circular opening 46 which receives the reduced-diameter portion of a plug 48 which is in turn received by a circular recess 50 in the housing. The relationship between the plug 48 and opening 46 augments the mounting of the carrier 26 on the housing 20.

The coupling assembly includes first and second or front and rear coupling parts designated respectively in their entireties by the numerals 52 and 54. The front or female coupling part has an elongated cylindrical forward portion 56 and a larger rear cylindrical portion 58. These cylindrical portions are received respectively by the carrier bores 40 and 42. The portion 56 is axially hollow or has a fore-and-aft axial bore 60 which is reduced at its forward end to afford an annular conical valve seat 62 which is controlled by a valve ball 64 biased to close on the seat by a spring 66 carried in part by and reacting against the reduced forward portion of an interior plug 68 which is retained in the bore 60 against axial forward shifting by means such as a snap ring 70. The tubular portion 56 of the coupling part 52 is provided with a plurality of radial ports 72 which, in the position of the coupling shown in FIG. 3, are in register with the internal carrier groove 32. The radial ports communicate with that portion of the coupling part 52 ahead of its plug 68 and consequently fluid entering the radial port 72 may, at times, flow rearwardly through the coupling and past the open seat 62 if the valve ball 64 is unseated. In another position of the coupling, which will be brought out below, the pressure passage 22 in connectible to the return passage 38 in the housing 20 by fore-and-aft ports 74 in that portion of the coupling part normally in radial register with the carrier groove 34. In lieu of separate ports 74, an annular groove may be provided, which is an obvious expedient. When the coupling is in the position of FIG. 3, the port means 74 is in radial register with the carrier groove 34. In the position of the coupling shown in FIGS. 5 and 6, the port means 74 interconnects the grooves 32 and 34 in the carrier 26 and consequently interconnects the pressure and return passages 22 and 38 in the housing. This arrangement is not a material part of the present invention but is disclosed and explained as part of the environment thereof.

As will be clear without further description, except where special results are obtained, the several components of the coupling assembly are appropriately sealed with annular rings, which may be of any conventional type, as at 76 and 78.

The bore 60 in the coupling part 52 opens rearwardly beyond the valve seat 64 as what may be regarded as a stepped counterbore or rearwardly facing socket 80, the details of which may best be seen in FIG. 4, wherein it is clear that the counterbore is made up of a plurality of coaxial annular interior surfaces. The first of these is rearwardmost and is designated by the numeral 82 and comprises the section of a forwardly tapering cone. The surface extends forwardly to a circular junction line 84 with a second annular interior surface 86 comprising a section of a coaxial cylinder, the forward end of which terminates as a circle 88 which represents also the rear end of a third annular internal surface 90 comprising the section of a forwardly tapering cone. Both cones are of course regular about the common axis of the assembly and in this particular instance, the elements of the two cones are parallel, providing in succession the conical, cylindrical and conical surfaces 90, 86 and 82. It will also be noted that the axial length of the cylindrical surface 86 is relatively short compared to the axial lengths of the conical surfaces 82 and 90, the reason for which will be explained below.

The coupling part 54 is capable of being forwardly axially receivable in the socket or counterbore 80 and may be rearwardly axially withdrawn from that counterbore, and for that purpose it has its forward portion shaped to match or conform with the stepped counterbore. This is also best shown in FIG. 4 (see also FIGS. 5 and 6), wherein it is apparent that the forward portion of the coupling part 54 has a forward conical external surface 92, an intermediate cylindrical surface 94 and a rear conical surface 96. When the coupling parts are connected, the counterbore surfaces 82, 86 and 90 respectively receive and mate with the surfaces 96, 94 and 92 of the coupling part 54.

The rearward portion of the coupling part 52, which contains the socket or counterbore 80, may be regarded as a portion that borders that socket, and that portion is provided with a plurality of generally radially directed openings 98, each of which receives a locking element, here in the form of a ball 100. The shape of each opening 98 is such that the ball may move freely lengthwise of the opening but may not escape from the inner portion of the opening, an expedient well known to those versed in the art and thus requiring no elaboration here. The forward portion of the coupling part 54 has recess means in the form of an annular groove 102 which, when the parts are connected (FIGS. 3 and 4), is in radial register with the balls 100 so that portions of the balls are receivable in the groove 102 while other portions of the balls are receivable in their respective openings 98. When the coupling parts are connected, the balls are confined by the internal annular surface of the counterbore 42 of the carrier, so that the balls are retained against escape or ejection radially outwardly as respects the ball-containing openings 98. However, if the coupling parts are shifted in unison rearwardly relative to the housing-confined carrier 26, the balls become radially registered with the annular control ring 44 on the carrier, previously referred to. Since the diameter of the bore in the ring 44 is larger than that of the bore 42, the balls can escape from the groove 102, being assisted outwardly by means in the groove accomplishing radial outward ejection of the balls, in respect of which the groove 102 is shaped so that a forward portion thereof constitutes an annular ramp 104. This expedient is of course broadly known and needs no special treatment here. When the coupling parts are disconnected or separated, they will occupy preliminarily such positions as shown in FIGS. 5 and 6. These positions also represent positions just prior to reconnection of the coupling parts, which is accomplished by forward insertion of the coupling part 54 into the socket 80 of the forward coupling part 52. Since the balls 100 are still in register with the control ring 44, they will be cammed outwardly until the coupling part portions 92, 94 and 96 seat in the respective counterbore portions, following which the two coupling parts will move forwardly in unison so that the balls move into the counterbore 42 to be confined thereby so as to incur the normal or connected condition of the coupling parts.

The rear portion 58 of the coupling part 52 has therein an annular groove 106 which contains a seal ring 108, which may be of any conventional type. The annular groove is located primarily in radial register with the conical surface 90 and provides an adequate seal between the coupling parts. As previously noted, the cooperating conical and cylindrical surfaces afford advantages not heretofore attainable. These are derived principally in separation of the coupling parts, which may be best understood by recognizing that in the normal coupling, rearward separation of the coupling part 54 from the coupling part 52 is at times accomplished incident to the application to the coupling part 54 of a rearward separating force.

Theoretically, if the couplings are interconnected by surfaces including mating cylinders, the separating force would have to be perfectly axial. However, as a practical matter, such perfect application of forces is seldom encountered, since the units of the vericular train are articulately interconnected and on turns and otherwise the forces may be applied at what may be regarded as adverse angles; that is, they are not axial but are at angles to an axis common to the coupling parts. The present design enables separation of the coupling parts upon the application of forces at relatively highly adverse angles, and thus is an improvement over known couplings. Moreover, the axial length of the cylindrical surfaces 86 and 94 is relatively short as compared to the axial lengths of the conical surfaces. This enables the attainment of a close diametrical clearance despite variations in axial dimension between the two coupling parts, and thus the fluid-tight characteristic of the assembled coupling is improved. The relative axial shortness of the cylindrical surfaces of course contributes to the ability of the coupling to separate or break away in response to the application of separating forces at angles to an axial line common to the coupling parts.

The coupling part has an internal axial passage or bore 110 which is shaped at its forward end to provide a coaxial conical valve seat 112 which is controlled by a valve ball 114. This ball is normally biased to close the seat by a spring 116 guided by and reacting against a threaded plug 118 of reduced cross section (see FIG. 2).

From the description thus far, it will be apparent that the two coupling parts 52 and 54 are provided respectively with passages established by the bores 60 and 110 and that these bores are normally communicable via the valve seats 62 and 112, depending upon the condition of the respective valves 64 and 114. As pointed out, these valves are normally biased to closed conditions by their respective springs 66 and 116. Now, disregarding additional structure, it will be noted that when the coupling parts are connected (FIG. 3) the balls are out of contact with each other; that is to say, the valve balls are spaced axially apart and, without more, the respective springs urge these valve balls to closed conditions as respects the respective seats. Consequently, fluid cannot flow through the coupling lines interconnected by the coupling parts. The passage 22 in the housing 20 represents the coupling line connected to the coupling part 52, and a coupling line 120, shown digrammatically, is the line connected to the coupling part 54. For the purpose of controlling the open and closed relationships of the valve bores 64 and 114, the present invention provides valve operating means, designated in FIGS. 1–6 by the numeral 122. The details of this means will be described below.

For the purpose of carrying the valve operating means, the carrier 26 is provided with a fore-and-aft slot 124 at the side thereof diammetrically opposite the opening 46 that receives the previously described plug 48. In this case, the slot 124 is at the top of the carrier. The coupling part 52 has therein a transverse bore 126 which intersects the coupling part bore rearwardly of the valve seat 62. The valve operator is in the form of a plunger which is carried by the bore 126 and which has an internal portion in the form of cam means 128, an external or upper end portion in the form of a head 130 and a lower portion 132.

The plunger 122 has two positions, one of which is shown in full lines in FIG. 3 and the other of which is shown in broken lines in the same figure. Accomplishment of these two positions results automatically or manually, the former as the result of a ramp or cam means 134 in the plug 48 and the latter by means of a handle or lever 138 cooperative with the head 130. The plunger 122 is appropriately sealed as at 136 in the opposite portions of the bore 126 and is axially shiftable along its own axis.

In one position of the plunger, as shown in full lines in FIG. 3, wherein the coupling assembly is in coupled relationship, the plunger 122 is in its down or operating position, the lower end 132 being received by the low part of the ramp means 134 and the high part of the cam means 128 (the full diameter of the plunger) being interposed between the coupling part balls 64 and 114 so as to positively hold these balls open or off their respective seats and against their respective springs 66 and 116. Thus, the coupling assembly is conditioned to transmit fluid therethrough. In the other position, shown in broken lines in FIG. 3, the plunger is in its up position, in which the low part of the cam means 128 is now in axial register with the two balls 64 and 114, thus allowing the balls to move onto their seats under action of their respective springs. The dimension of the low part of the cam means 128 is such as to allow the balls to freely seat without interference from the plunger. The positions of the plunger 122 are limited, downwardly by the ramp means 134 and upwardly by the provision of a stop in the form of a snap ring 140 about the lower end 132 of the plunger.

As best seen in FIG. 2, the lever 138 is an elongated element of C-section which receives the head 130 of the plunger 132, the plunger of course being necked down as shown to be received in the slot afforded by the open underside of the lever. A transverse member 142, welded or otherwise rigidly secured to the forward end of the lever, and being formed of cylindrical section, serves as a fulcrum, while a similar member 144 at the rear end of the lever serves as a handle.

The valve operator controlling lever 138 is confined between the top surface of the carrier 26 and the undersurface of the mid-portion of the cap 28 and has a storage position as shown in full lines in FIG. 3 and an extended position as shown in dotted lines in the same figure. From the latter position, the lever may be manually moved to an operating position as shown in dot-dash lines in FIG. 3. Biasing means in the form of a spring strip 146 is rigidly secured to the underside of the cap 28 and presses downwardly on the top of the lever, and the terminal rear portion of the spring is conformed as shown at 148 to engage the lever 138 via an opening 150 which, when the lever is in its storage or retracted position, also receives the upper partly spherical head 130 of the plunger 132, thus effecting a detent. In this position of the parts, the plunger 122 is pressed downwardly to its full-line position of FIG. 3, thus forcing the balls 64 and 114 apart so as to open their respective seats 62 and 112. The lower end of the plunger 122 is at this time centered in the ramp means 134 and the coupling parts are connected via the releasable means 100–102, previously described. The connected coupling parts are in their forward or normal positions relative to the carrier 26, so that the control portion established by the counterbore 42 of the carrier 26 confines the balls 100 to their locking groove 102 in the coupling part 54. Under these conditions, the forces exerted by the several components are sufficient to retain the normal or forward position of the connected coupling assembly. That is to say, the connected coupling assembly will resist rearward forces below a certain magnitude, and the parts are designed so that this magnitude is calculated to accommodate normal conditions preventing inadvertent separation of the coupling parts. However, should the connection between the vehicle units become disconnected or broken, the axial force exerted on the hose line 120, which is attached to the coupling part 54, will exert a force higher than that noted, resulting in separation of the coupling parts. The result will be that shown in FIG. 6, wherein it is clear that the rearward force exerted on the coupling assembly by tensional force applied to the hose line 120 has initially shifted the entire coupling assembly rearwardly relative to the carrier 26 which, as previously described, is rigid on the supporting housing 20. As the two coupling parts shift rearwardly in unison, the ring of balls 100 moves rearwardly relative to the counterbore 42, until they ultimately come into radial register with the control ring 44, the junction of which with the counterbore 42 is in the form of an annular seat 152 as is relatively conventional. In addition, the cam or ramp means provided by the annular surface 104 on the coupling part groove 102 tends to force the balls outwardly so that when the balls attain radial register with the control ring 44, they move outwardly and free the coupling part 54 for continued rearward movement. At the same time, the valve 114 in the coupling part 54 moves immediately to its closed position on its seat 112 by action of the spring 116. As previously described, the control balls cannot escape from the pockets or openings 98 in which they are confined in the rear end of the coupling part 52.

What is significant in the rearward movement of the coupling part is that as it so moves, the lower end 132 of the valve operating plunger 122 climbs the ramp 134, forcing the plunger upwardly to the position shown in FIG. 6, which puts the low portion of the cam 128 in axial register with the valve ball 64 in the coupling part 52, whereupon this valve can seat on its seat 62 under action of its spring 66. Thus, both coupling parts are automatically sealed against the loss of fluid. The cam means 134 thus affords an automatic mechanism whereby the valves 64 and 114 close without any direct action on either by the other.

As will be clear, the length of the slot 124 in the carrier coincides with the length of travel desired to effect not only separation of the couplings but automatic closure of the valves 64 and 114. In addition, the lower portion 132 of the plunger is limited by the annular shoulder provided on the cap 48. In short, fore-and-aft movement of the coupling part 52 is confined to the extent of travel permitted by the length of the slot 124 since, as will be seen in FIG. 3, the coupling part in its forward position results in engagement of an upper portion of the plunger 122 with the forward extremity of the slot 124.

The frictional and biasing forces overcome by rearward movement of the coupling part result from the relationship, for example, between the lower end 132 of the plunger 122 and the ramp means 134, the action of the biasing spring 146 on the lever 138, the frictional forces between the valve balls 64 and 114 and the cam means 128 and the frictional forces involved in the releasable means including the balls 100, groove 102 in the coupling part 54 and the counterbore 42 in the coupling part 52. However, not all of these forces are involved in recoupling of the coupling parts. For example, the biasing action of the spring 146 is an assist in re-coupling. Moreover, as re-coupling is accomplished, the coupling parts move forwardly and the lower end 132 of the plunger 122 is now moving downwardly on the ramp means 134 under action of the sprign 146 via the lever 138. In initial coupling, the groove 102 in the coupling part 54 first becomes radially registered with the ring of balls 100, and continued forward movement effects re-coupling in a simple and easy manner.

What is more significant, however, is the fact that the operator does not have to overcome hydraulic forces in the fluid lines. This may be best understood by noting that the balls 64 and 114, when seated, and when the plunger 122 is in the position shown in FIG. 6, are not in direct contact with each other and, as previously described, the configuration of the low portion of the cam means 128 is such that the balls are capable of seating without being forced from their seats by this low portion of the cam means. Therefore, any fluid pressure in the lines behind the balls and acting to keep the balls seated does not have to be manually overcome in the axial reconnection of the coupling part. After the parts are reconnected, the valve plunger 122 may be manually depressed by action of the lever 138 and the mechanical advantage is sufficient, particularly since the coupling parts are already connected, to readily overcome the hydraulic forces acting upon the balls 64 and 114. As a preliminary to effecting re-coupling of the coupling parts, the lever 138 may be moved forwardly from the position shown in FIG. 6 until the fulcrum 142 engages the turned-down forward end of the spring 146, in which case a second hole or opening 154 in the lever 138 will effect a detent action with the top or head of the plunger 122. As an alternate, the hole 150 may be omitted and reliance placed on friction between the lever 138 and head 130 in the original position of the coupling parts. The invention contemplates the use of the lever mechanism and its relationship to the plunger in either of the variations suggested.

Another point of note is that when the coupling is shifted rearwardly as an incident to disconnection thereof, the groove or port 74 effects a connection between the grooves 32 and 34 and thus connects the high pressure passage 22 to the return passage 38, relieving the hydraulic force behind the ball 64.

The broken-line positions in FIG. 3 and the illustration in FIG. 5 demonstrate manual operation of the valve operating plunger 122. FIG. 3 shows in full lines that the lever 138 is in its retracted or storage position. One reason for having the extended position as shown in broken lines is to enable the lever to be moved outwardly to facilitate manipulation thereof relative to overhanging structure, some of which is schematically illustrated at 156. Although, in the full line position of FIG. 3, there is a sufficient rearward portion of the lever 138 to enable the operator to lift same for moving the operator 122 upwardly, a better mechanical advantage is obtained when the lever is pulled rearwardly, the fulcrum 142 sliding along the top surface of the carrier 26 and the lever being guided, of course, by the relationship between its C-section and the neck below the head 130. Specifically, the lever is drawn rearwardly to the dotted line position, where it is clear of the overhanging structure 156, at least in the immediate vicinity of the rear portion of the cap 28. In this position, the valve operator is not disturbed and of course is in its position in which it is holding the balls 64 and 114 off their respective seats. The operator may then lift the rear end of the lever, with the fulcrum 142 bearing on the top surface of the carrier 26, achieving the position of FIG. 5 if, at the same time, the operator also manually moves the coupling parts rearwardly, in which case he has to overcome the force between the lower end 132 of the operator 122 and the ramp means 134. However, the lever 138 affords an expedient for eliminating the necessity of overcoming this force, since lifting the lever raises the plunger and consequently the only remaining force necessary to be overcome is frictional force resulting from sliding surfaces, particularly between the coupling and carrier 26, which is negligible, and that developed in the locking means 100—102. At the same time, the balls are caused to seat and the coupling parts are sealed against the loss of fluid.

The dot-dash lines in FIG. 3 illustrate operation of the valve means 64—114 without effecting uncoupling of the parts, as when it is desired to close the passages without separation of the coupling parts. In short, the coupling operates in a simple and expedient manner, and may be separated either automatically or manually. In either case, an incident to separation is shifting of the coupling parts in unison from a forward position to a rearward position. When the shifting occurs as a result of tensional forces applied to the hose line 120, for example, the valve operator 122 operates automatically to incur closing of the valves 64 and 114. When the manipulation is manual, the valve operator is operated by hand via the lever 138 to accomplish the same result. A distinction between manual and automatic operation arises because of the necessity for ease of manual disconnection, in which case the lever 138 serves as means for removing the force incident to the relationship between the operator 122 and ramp 134, as pointed out above. Likewise, reconnection is facilitated because, as already outlined, the operator does not have to overcome hydraulic forces behind the balls 64 and 114.

FIGS. 7 and 8 show a modification in which connection and reconnection is further facilitated. In these figures, a modified form of design of the coupling parts and carrier is illustrated and, for the purpose of relating this design to that already described, similar reference characters with the suffix "*a*" will be employed. Thus, there is shown a carrier 26*a*, a coupling part 52*a* and a coupling part 54*a*. The carrier is provided with a slot 124*a* which accommodates a valve operator 122*a* just as before. The relationship between the coupling parts, so far as concerns the releasable means, is primarily the same, to the extent that the rear end of the coupling part 52*a* carries a ring of balls or lock elements 100*a* and the coupling part has a ball-receiving groove 102*a*. However, an important distinction occurs over the structure previously described, in that the carrier 26*a* has a counterbore 42*a* enlarged over that previously described so as to accommodate a control ring or retainer 44*a* which here, as distinguished from the control ring 44 previously described, is not a part of the carrier but rather is a separate ring functioning to retain the balls 100*a* when the coupling parts are connected (FIG. 7). Thus, radially outwardly operating forces resulting from the balls 100*a*, as tended to be ramped out by a ramp 104*a* on the coupling part groove 102*a*, as the parts are attempted to be separated, act directly on the ring 44*a* rather than on the counterbore 42*a* and the high forces present in FIGS. 1–6 are not present in the modified structure. This may be best understood when it is noted that in FIGS. 1–6 the balls 100 act directly against the counterbore 42 and thus develop high frictional forces as the coupling parts move rearwardly relative to the carrier. In FIGS. 7 and 8, these forces are exerted against the ring 44*a* which, as will be readily seen, is of a smaller outside diameter than the inside diameter of the counterbore 42*a*. Thus, as the coupling parts 52*a* and 54*a* move rearwardly incident to separation thereof, the ring 44*a* moves in unison therewith. Release is effected by interrupting rearward travel of the ring 44*a* as the coupling parts 52*a* and 54*a* continue. This is accomplished by stop means, here in the form of a snap ring 158 carried at the terminal rear end of the counterbore 42*a*. Thus, as the coupling parts and ring move rearwardly in unison to a point short of releasing condition, the snap ring 158 engages the ring 44*a* and stops its travel. The inner diameter of the ring 44*a* is provided with a counterbore 160 which has the same function as the control ring 44 in FIGS. 1–6; that is to say, it accommodates radial outward movement of the balls 100*a*, and the couplings become disconnected. FIG. 8 shows the condition of the parts when the ring 44*a* is interrupted by the snap ring 158, from which it will be seen that further rearward travel of the coupling parts 52*a* and 54*a* will occur relative to the stopped or interrupted control ring 44*a*, the balls 100*a* then escaping into the counterbore 160 of the control ring. This may be further appreciated by noting that the limiting action set up between the operator 122*a* and slot 124*a* in the carrier 26*a* is not complete, since the operator 122*a* has a distance to go rearwardly before it engages the rear extremity of the slot which, for convenience, is designated here at 162. The advantage of this design is that as the coupling parts and control ring move rearwardly and the control ring is then suddenly interrupted, an impact force is derived which results from the rearward inertia of the moving coupling parts. In other words, the three parts 52*a*, 54*a* and 44*a* travel in unison and the movement of the one part (44*a*) is interrupted so that the other two continue. This is particularly an advantage in manual disconnection of the coupling parts.

When reconnection is to be effected, the coupling part 54*a* is inserted into the coupling part 52*a* and the two move forwardly together. In this condition, a snap ring 164 on the rear terminal end of the coupling part 52*a* engages the control ring 44*a* and moves it forwardly to its original position. In this respect, FIG. 8 may be regarded as a position preliminary to complete reconnection of the parts, noting, again, that the operator 122*a* is substantially midway between the front and rear ends of the slot 124*a*. In all other respects, the valve operation and relationship between the coupling parts, so far as concerns the novel design of the counterbore and forward end of the coupling part 54 (54*a*) are the same as described above.

FIGS. 9–13 show a modified form of arrangement in which a different valve control means is used. However, the basic concept is the same and the same or similar coupling parts and carrier may be used. Therefore, in the interests of clarity, reference numerals previously employed will be used but will bear the suffix "*b*."

The supporting means for the modified form of arrangement is represented by a housing 20*b* having passages (not shown) which may be the same as those previously described. The housing mounts a carrier 26*b* similar to the carrier 26, except in this case the carrier 26*b* is rotated 90° from the carrier 26 so that the opening and slot corresponding respectively to those at 46 and 124 in FIGS. 1–6 are at the opposite sides of the carrier, designated here, respectively, at 46*b* and 124*b*. The carrier 26*b* is retained in place by a clamp 28*b* and cap screws 30*b*. If desired, additional mounting means may be employed at the rear end of the carrier, such as that shown generally at 166. This means has a tang 168 which serves to locate the carrier in initial assembly. FIGS. 12 and 13 show, fragmentarily, sectional portions of cooperative coupling parts 52*b* and 54*b*, which may be identical to those previously described. These coupling parts respectively have self-sealing balls 64*b* and 116*b*, and the coupling part 54*b* may be used to connect a fluid line 120*b*. It will be clear, without further description, that other details may be exactly as previously described and that the coupling parts occupy the same relationship to the carrier 26*b* as do the coupling parts 52 and 54 relative to the carrier 26.

A valve operator 122*b* has an internal portion 128*b* and an external portion 130*b*, here in the form of a handle. The handle is of L-shape and has a lower portion 132*b* which is cooperative with cam means 134*b* carried by the housing 20*b*. The cam in this case is a headed member screwed into an appropriate aperature in the housing 20*b*, which will be obvious without elaboration. The internal portion 128*b* is in the form of a cross shaft welded or otherwise rigidly secured externally to the operating handle 130*b* and this shaft portion extends transversely between the spaced apart balls 64*b* and 116*b* (FIGS. 12 and 13) passing at one side through the slot 124*b* and being accommodated at the other side by the opening 46*b*, which is here shown as being closed by a cap 170. This, however, is an incident to the use of the same type of carrier as the carrier 26 and, in other constructions, the details would be different. Nevertheless, the slot 124*b* accommodates the operator 122*b* as it moves fore and aft when the coupling parts shift in unison in the carrier 26*b*, the internal portion 128*b* of the operator having the same relationship to the coupling 52*b* as that between the operator 122 and coupling part 52.

When the coupling parts are in their normal forward or operating position, the operator handle 130*b* is in the position shown, in which position it is retained by a detent action accomplished between a slot 150*b* formed in one side of the carrier 126*b*, in cooperation with the cylindrical section of the lower portion 132*b* of the operator. This portion 132*b* of the operator is against the forward face of the cam means 134*b*. The internal portion 128*b* is in the form of cam means represented in FIGS. 12 and 13 and, in the FIG. 10 position of the parts, the portion 128b is in the position of FIG. 12, in which the high portions of the cam means operate to forcibly unseat the balls 64b and 116b. When it is desired to release the coupling parts manually, the operator turns the lever or valve operating means 122b to the position shown in dotted lines. This causes the interior portion 128b to assume the position of FIG. 13, in which the low portions of the cam means are now presented to the balls 64b and 116b, whereby the balls may close under action of their springs (not shown). The operator may then separate the coupling parts 52b and 54b in the manner described in connection with FIGS. 1–6; that is, he merely pulls rearwardly on the coupling part 54b to overcome the forces involved in the releasable locking means, which may be the same as that described at 100—102. In reconnection, the coupling part 54b is inserted forwardly into the coupling part 52b and again the operator need not overcome hydraulic forces in the lines, since the position of the internal portion 128b of the operator 122b will accommodate the balls (FIG. 13) and the operator need move the entire coupling assembly forwardly relative to the carrier 26b. In this position, the two coupling parts are interconnected by the releasable means and the operator 122b may now be turned to the full line position of FIG. 10, which achieves the position of FIG. 12 for the internal portion 128b, thus opening the balls 64b and 116b.

In the case of automatic operation, the two coupling parts move rearwardly relative to the carrier 26b. Since the operator 122b is carried by the coupling part 52b, it will move rearwardly with the coupling parts. As it does so, the lower portion 132b thereof will be engaged by the cam 134b and continued movement of the coupling parts in unison causes the operator to not only shift rearwardly but also to turn to the dot-dash line position illustrated, thus automatically achieving the position of FIG. 13 for the internal portion 128b and incurring closing of the valve balls 64b and 116b. A further slotted portion 154b is provided in the same side of the carrier 26b as the slot or recess 150b, which serves as a detent for retaining the dot-dash position of the operator 122b. An axial spring load (not shown) is imparted to the internal portion of the operator so as to accommodate the detent action at 150b and 154b. Reconnection of the coupling parts following automatic separation proceeds as described above. That is, the coupling part 54b is inserted into the coupling part 52b and the two are moved forwardly in unison. As the parts move forwardly, the operator 122, being now at the rear end of the slot 124b, will also be carried forwardly so that when the forward position of the connected coupling parts is achieved, the operator 122b may be readily returned to its full-line position. In other respects, the characteristics of the coupling are similar to those previously described, which will readily occur on the basis of the present disclosure.

Features and advantages not categorically enumerated herein will readily occur to those versed in the art, as will many modifications and alterations in the preferred embodiments of the invention disclosed here, all of which may be achieved without departure from the spirit and scope of the invention.

What is claimed is:

1. In combination: support means including a coupling carrier; a first coupling part carried by the carrier for fore-and-aft shifting between front and rear positions and normally disposed in said front position, said part having a fore-and-aft bore therein opening at the rear end thereof and said bore having a valve seat therein forwardly of said rear end, and a valve in said bore biased rearwardly to close said seat; a second coupling part coaxially forwardly received in said bore and having a front end normally closely spaced rearwardly of said first part seat, said second part having an axial bore therein including a valve seat at said front end and a valve in said second part bore biased forwardly to close said second part seat, said valves being normally exposed to each other through their respective seats in closely axially spaced apart relation; releasable means normally interconnecting the coupling parts against axial separation so that said two parts are shiftable rearwardly in unison to the aforesaid rear position, said releasable means being operative when said rear position is reached to release the second part axially rearwardly from said first part; a valve operator carried by the first coupling part for movement between first and second positions and including an internal portion transverse to the axis of said parts and further including an external portion exterior to said first coupling part, said internal portion including cam means interposed between the exposed valves when the coupling parts are connected and operative in said first position to unseat both valves and operative in said second position to enable biased closing of both valves; and means on the support means engageable with the external portion of the operator to cause said operator to assume its second position when the coupling parts move in unison to said rear position.

2. The invention defined in claim 1, including: a manually operative lever carried by the support means externally of the coupling parts; and means interconnecting said external portion of the operator and said lever.

3. The invention defined in claim 2, in which: the lever lies fore and aft and has a fulcrum engageable with the support means and is mounted for fore-and-aft shifting, and the interconnecting means includes a fore-and-aft slidable connection between said lever and said external portion of the operator enabling fore-and-aft shifting of the lever relative to the operator to change the fore-and-aft position of said fulcrum relative to said operator.

4. The invention defined in claim 3, in which: said sliding connection includes a fore-and-aft groove in the lever and a head on said external operator portion received in said groove.

5. The invention defined in claim 2, including: means biasing the lever to a static position whereby the lever in turn incurs the first position of the operator.

6. In combination: a pair of separable, normally connected fluid line coupling parts respectively having fluid passages therein for communication with each other when said parts are connected, each part having a valve operative to open and close its passage; releasable means normally retaining said parts in connected relation; support means mounting the coupling parts for shifting in unison, while connected, from a normal position to a releasing position and including a stop effective to retain one of the parts when said releasing position is attained; said releasable means being operative to release the other part when the parts attain said releasing condition; a valve operator carried by a coupling part for movement between first and second positions and operative in said first position to positively open the valves in the connected coupling parts and operative in said second position to incur closing of said valves; and means cooperative between the support means and the valve operator for automatically causing movement of said operator to its second position incident to shifting of said parts to said releasing position.

7. The invention defined in claim 6, in which: said valve operator includes a handle portion enabling movement thereof manually independently of shifting of said parts.

8. In combination: fluid coupling means having a passage therein and a valve operative selectively to open and close said passage; a valve operator carried by the coupling means and selectively settable in first and second positions to respectively open and close said valve, said operator having an internal portion engageable with the valve and an external portion exteriorly of the coupling means; support means carrying the coupling means for shifting between connect and disconnect positions and including an element closely overlying said coupling means in the area of said external portion; and means for manually changing the position of the operator while the coupling means is in its connect position, including a member movably carried by the support means and engaged with said external portion while said operator is in its aforesaid second position and said member retaining engagement with said external portion but movable relative thereto and relative to said element between a retracted position overhung by said element and an extended position generally clear of said element, said member in said extended position being further movable to act through said external portion to move the operator to its second position.

9. The invention defined in claim 8, in which: said element and the coupling means have closely spaced surface portions facing each other to provide a slide, the member is a lever receivable by and movable along said slide and has a fulcrum engageable with one of said surfaces when moved generally beyond said element and further engages the external portion of the operator at a portion of said member spaced from said fulcrum so that rocking of said lever moves the operator.

10. The invention defined in claim 9, in which: the external portion of the operator includes a head and the lever has a groove therein receiving said head and running parallel to said slide.

11. The invention defined in claim 10, in which: biasing means operates between the support means and the lever to urge the lever to a position incurring the first position of the operator, and said head and a portion of the lever engageable with said head are constructed to provide a detent deriving force from said biasing means and releasably retaining the lever in its retracted position.

12. In combination: a pair of fluid line coupling parts and releasable means operative selectively to connect and disconnect said parts; each coupling part having a passage therein and at least one of said parts having a valve biased to close its passage, said parts being so constructed and disposed that when the parts are connected said valve in its closed position is spaced apart from and out of direct contact with the other coupling part whereby connection and disconnection are attainable without said valve being directly influenced by the other part; valve operating means carried by a coupling part and including an internal portion provided with cam means operative selectively between the spaced apart valve and the other part in a first position enabling the biased valve to remain closed while the parts are connected and being connected and in a second position positively opening said valve when said parts are connected, said operating means having an external portion for positioning the cam means; support means mounting a coupling part for limited shifting so that said parts when connected are shiftable in unison, said releasable means being constructed to release the parts from each other incident to said shifting in unison to a predetermined extent; and means on the support means and operative to engage said external portion in response to said shifting in unison to automatically incur the second position of the cam means.

References Cited in the file of this patent

UNITED STATES PATENTS

| | | |
|---|---|---|
| 2,614,866 | Ulrich | Oct. 21, 1952 |
| 2,619,367 | Hanson | Nov. 25, 1952 |
| 2,625,410 | Crowley | Jan. 13, 1953 |
| 2,643,140 | Scheiwer | June 23, 1953 |
| 2,675,829 | Livers | Apr. 20, 1954 |
| 2,736,578 | Rafferty | Feb. 28, 1956 |
| 2,869,582 | Skipwith | Jan. 20, 1959 |

FOREIGN PATENTS

| | | |
|---|---|---|
| 383,633 | Great Britain | Nov. 21, 1932 |